United States Patent [19]

Takizawa et al.

[11] Patent Number: 5,070,233
[45] Date of Patent: Dec. 3, 1991

[54] IC CARD READER/WRITER AND IC CARD TRANSACTIONS PROCESSING APPARATUS CAPABLE OF PRODUCING VARIOUS FREQUENCY CLOCK PULSES

[75] Inventors: Toshio Takizawa; Hiroharu Hirata, both of Tokyo, Japan

[73] Assignee: Oki Electric Industry Co., Ltd., Tokyo, Japan

[21] Appl. No.: 367,728

[22] Filed: Jun. 19, 1989

[30] Foreign Application Priority Data

Jun. 24, 1988 [JP] Japan ................................. 63-154620

[51] Int. Cl.$^5$ .............................................. G06K 5/00
[52] U.S. Cl. ...................................... 235/380; 235/492
[58] Field of Search ................. 235/375, 380, 492, 441

[56] References Cited

U.S. PATENT DOCUMENTS

| | | | |
|---|---|---|---|
| 4,650,981 | 3/1987 | Foletta .................................. | 235/492 |
| 4,727,244 | 2/1988 | Nakano et al. ....................... | 235/380 |
| 4,798,941 | 1/1989 | Watanabe ............................ | 235/492 |
| 4,810,862 | 3/1989 | Nakano et al. ....................... | 235/380 |
| 4,818,855 | 4/1989 | Mongeon et al. .................... | 235/492 |
| 4,845,347 | 7/1989 | McCrindle et al. .................. | 235/492 |
| 4,899,036 | 2/1990 | McCrindle et al. .................. | 235/492 |
| 4,928,000 | 5/1990 | Eglise et al. ......................... | 235/492 |

*Primary Examiner*—Stuart S. Levy
*Assistant Examiner*—Richard Weinberg
*Attorney, Agent, or Firm*—Spencer & Frank

[57] ABSTRACT

An IC card reader/writer has frequency mode identifying means for determining whether or not an IC card loaded thereon has an identifiable frequency. When the frequency mode of the IC card is identifiable, clock frequency determining means reads frequency data representative of an operating clock frequency out of the IC card to determine an operating clock frequency particular to the card. Based on the determined operating clock frequency of the IC card, frequency setting means converts reference clock pulses being generated by reference clock generating means into clock pulses which match the clock frequency of the IC card, and feeds those clock pulses to the card. The reader/writer is capable of producing clock pulses the frequency of which is variable in matching relation to the frequency of operating clock pulses of an IC card.

4 Claims, 6 Drawing Sheets

IC CARD READER/WRITER AND IC CARD TRANSACTIONS PROCESSING APPARATUS CAPABLE OF PRODUCING VARIOUS FREQUENCY CLOCK PULSES

BACKGROUND OF THE INVENTION

1. Field of the Invention

The present invention relates to an IC (Integrated Circuit) card reader/writer and, more particularly, to an IC card reader/writer for use with a business transactions processing apparatus which is operable with an IC card for executing various kinds of business transactions.

2. Description of the Prior Art

In parallel with the extensive use of IC cards, a card transactions processing apparatus capable of processing various kinds of business transactions data by using an IC card is attracting much attention and has been put to practical use. In general, a card transactions processing apparatus may be implemented by a keyboard, a display, a printer, an IC card reader/writer, and a pin pad.

When the processing apparatus having the above construction is loaded with an IC card, the IC card reader/writer reads data which are stored in the IC card. As one manipulates the keyboard to enter a transaction command and a key, a particular operation procedure or guidance is indicated on the display. When the operator sequentially enters data on the keyboard according to the guidance appearing on the display, the data are transmitted to central equipment to be processed thereby. The result of processing returned from the central equipment may be printed out by the printer of the processing apparatus, as needed.

Generally, an IC card has a particular operating clock frequency which is selected before it is issued. The predominant frequency mode selected for IC cards is, for example, 4.9152 megahertz mode in Japan and 3.579545 megahertz mode in U.S.A. and France. A prior art IC card reader/writer, therefore, has a clock generator implemented by an oscillator exclusively oscillating clock pulses having a frequency of 4.9152 megahertz or an oscillator exclusively oscillating clock pulses whose frequency is 3.579545 megahertz.

The single-frequency clock generator scheme stated above is undesirable from the standpoint of applicable range. Specifically, when an IC card reader/writer whose clock generator oscillates at a certain fixed clock frequency is loaded with an IC card which is operable in a different frequency mode, the reader/writer cannot read data out of the IC card at all so that the processing apparatus is practically useless.

SUMMARY OF THE INVENTION

It is therefore an object of the present invention to provide an IC card reader/writer which is operable with an IC card with no regard to the frequency mode assigned to the card and, yet, is inexpensive.

It is another object of the present invention to provide an IC card transactions processing apparatus using such an IC card reader/writer.

In accordance with the present invention, an IC card reader/writer for interchanging data with an IC card when the IC card is loaded thereon comprises frequency mode identifying means for determining whether or not the IC card has an identifiable frequency mode, clock frequency determining means for, when the frequency mode identifying means determines that the frequency mode of the IC card is identifiable, reading frequency data stored in the IC card and representative of an operating clock frequency for thereby determining the operation clock frequency, reference clock generating means for generating reference clock pulses having a predetermined frequency to feed clock pulses to the IC card, and frequency setting means for converting, in response to an output of the clock frequency determining means, the reference clock pulses being generated by the reference clock generating means into clock pulses which are associated with the IC card, and applying the clock pulses to the IC card.

Further, in accordance with the present invention, an IC card transactions processing apparatus having an IC card reader/writer, an inputting unit, and a displaying unit for performing transactions processing with an IC card comprises frequency mode identifying means for determining whether or not the IC card has an identifiable frequency mode, clock frequency determing means for, when the frequency mode identifying means determines that the frequency mode of the IC card is identifiable, reading frequency data stored in the IC card and representative of an operating clock frequency for thereby determining the operating frequency, reference clock generating means for generating reference clock pulses to the IC card, and frequency setting means for converting, in response to an output of the clock frequency determining means, the reference clock pulses being generated by the reference clock generating means into clock pulses which are associated with the IC card, and applying the clock pulses to the IC card.

When the frequency mode of the IC card is identifiable, the IC card reader/writer determines an operating clock frequency particular to the IC card by using frequency data which is stored in the card. Based on the determined operating clock frequency of the IC card, the reader/writer produces clock pulses matching the card by using reference clock pulses which are generated by clock generators, the clock pulses being fed to the card. The reader/writer, therefore, is capable of operating with two or more different kinds of IC cards each having a different frequency mode.

Likewise, the IC card transactions processing apparatus is usable with IC cards the operating clock frequencies of which are different from each other.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 1:
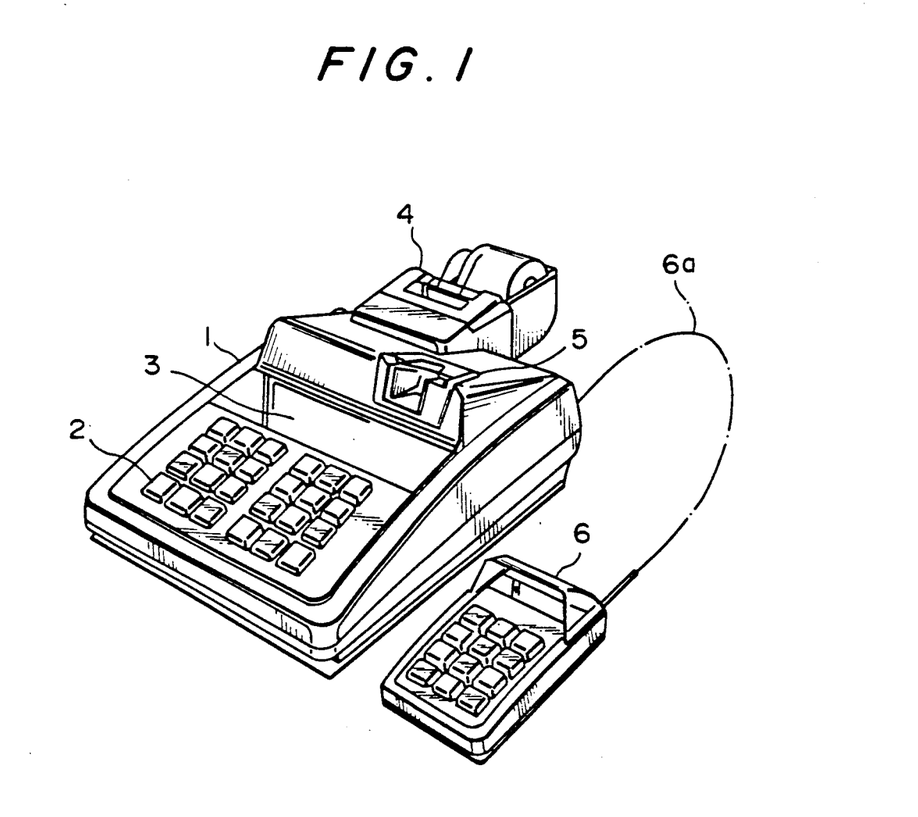
FIG. 1 is an external perspective view of an embodiment of the card transactions processing apparatus in accordance with the present invention.

Referring to FIG. 1 of the drawings, an IC card transactions processing apparatus embodying the present invention is shown and generally designated by the reference numeral 1. As shown, the processing apparatus 1 is generally made up of a keyboard 2, a display 3, a printer 4, an IC card reader/writer 5, and a pin pad 6. The keyboard 2 is located on the top of a front portion of the apparatus 1 and has a plurality of keys arranged thereon. Implemented as a liquid crystal display, for example, the display 3 serves to indicate an operation procedure or guidance and entered data thereon. The printer 4 is constituted by a thermal printer or similar printer for printing out data on a slip, for example. The IC card reader/writer 5 is capable of reading data out of an IC card and writing data in an IC card, as needed. Interconnected to the apparatus 1 by a cable 6a, the pin pad 6 may be manipulated by the operator to enter a code number and other specific data which are assigned to an individual.

The processing apparatus 1 having the above construction will be operated as follows. After a power switch (not shown) of the processor 1 has been turned on, an IC card (not shown) is inserted in the IC card reader/writer 5. Then, the reader/writer 5 reads various kinds of transaction command data and other data particular to the customer out of the IC card while feeding such data to a storage (not shown) which is built in the processing apparatus 1. In this condition, the operator manipulates the keybord 2 to enter a desired transaction command and a key of the IC card being loaded. Then, an operation procedure associated with the particular transaction is indicated on the display 3. As the operator enters necessary data on the keyboard 2 according to the operation procedure, a transmission control section (not shown) also built in the processing apparatus 1 sends the entered data to a central station or equipment (not shown). In response, the central station executes predetermined processing with the received data and, on completing the processing, reports the end of processing to the terminal or processor 1. This causes the printer 4 of the processor 1 to print out the data on a slip, for example.

Figure 2:
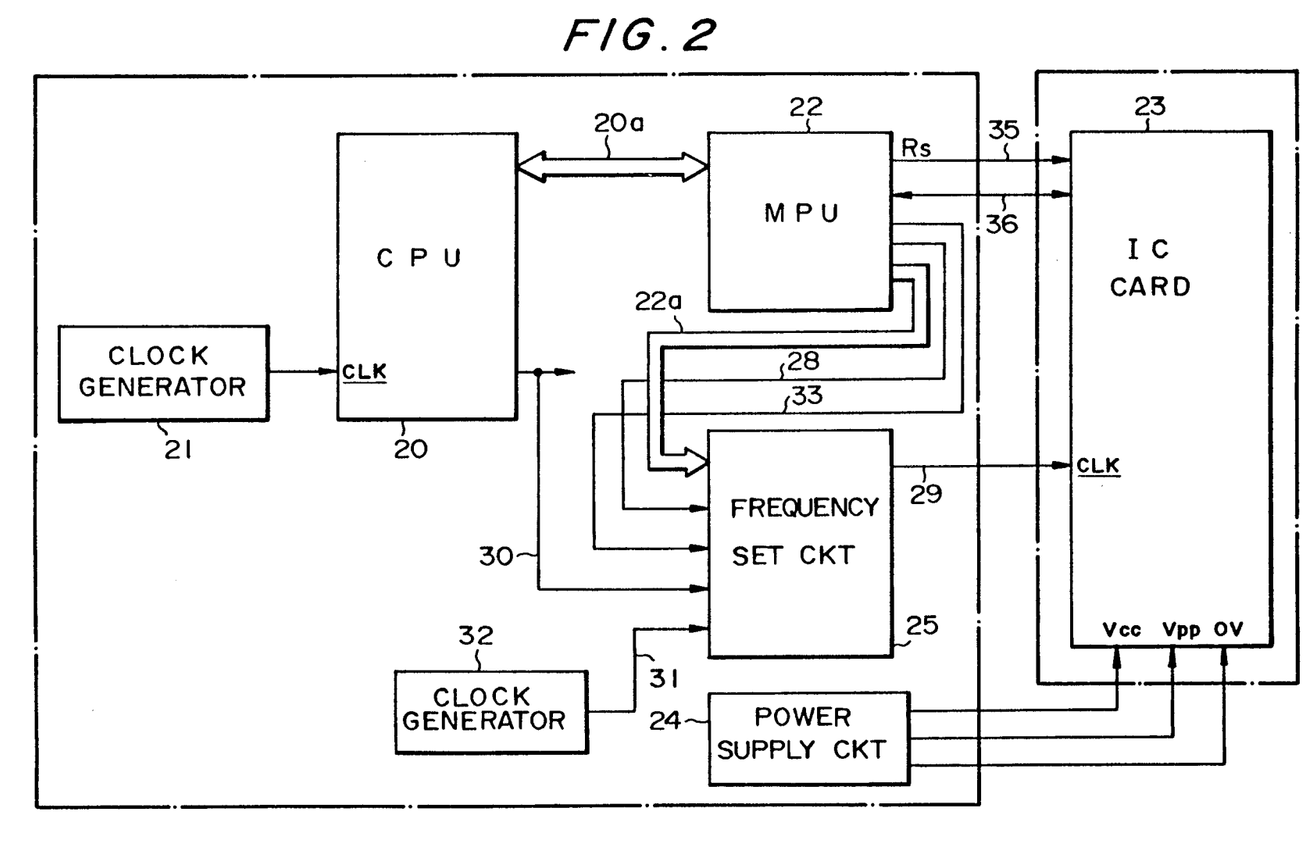
FIG. 2 is a schematic block diagram representative of an IC card reader/writer embodying the present invention.

Referring to FIG. 2, a specific construction of the IC card reader/writer 5 is shown in a schematic block diagram. In the figure, the reader/writer 5 has a single-chip CPU (Central Processing Unit) which supervises the operations of the entire reader/writer 5. The CPU 20 has a clock input CLK to which a first clock generator 21 is interconnected. The clock generator 21 produces clock pulses whose frequency is 14.7456 megahertz for clocking the CPU 20. These clock pulses are used to cause an IC card 23 to operate also, as described in detail later. An MPU (Micro Processing Unit) 22 is interconnected to the CPU 20 by a bus 20a so that, under the control of the CPU 20, it may interchange data with the IC card 23. When the IC card 23 is loaded on the reader/writer 5, a power supply circuit 24 is brought into connection with power supply terminals Vcc, 0V and Vpp of the IC card 23. Zero volt is applied to the power supply terminal 0V to serve as a reference input voltage, while predetermined different voltages for individually implementing a reading and a writing operation are applied to the power supply terminals Vcc and Vpp. A frequency setting circuit 25 is interconnected to the MPU 22 by a bus 22a.

Figure 3:
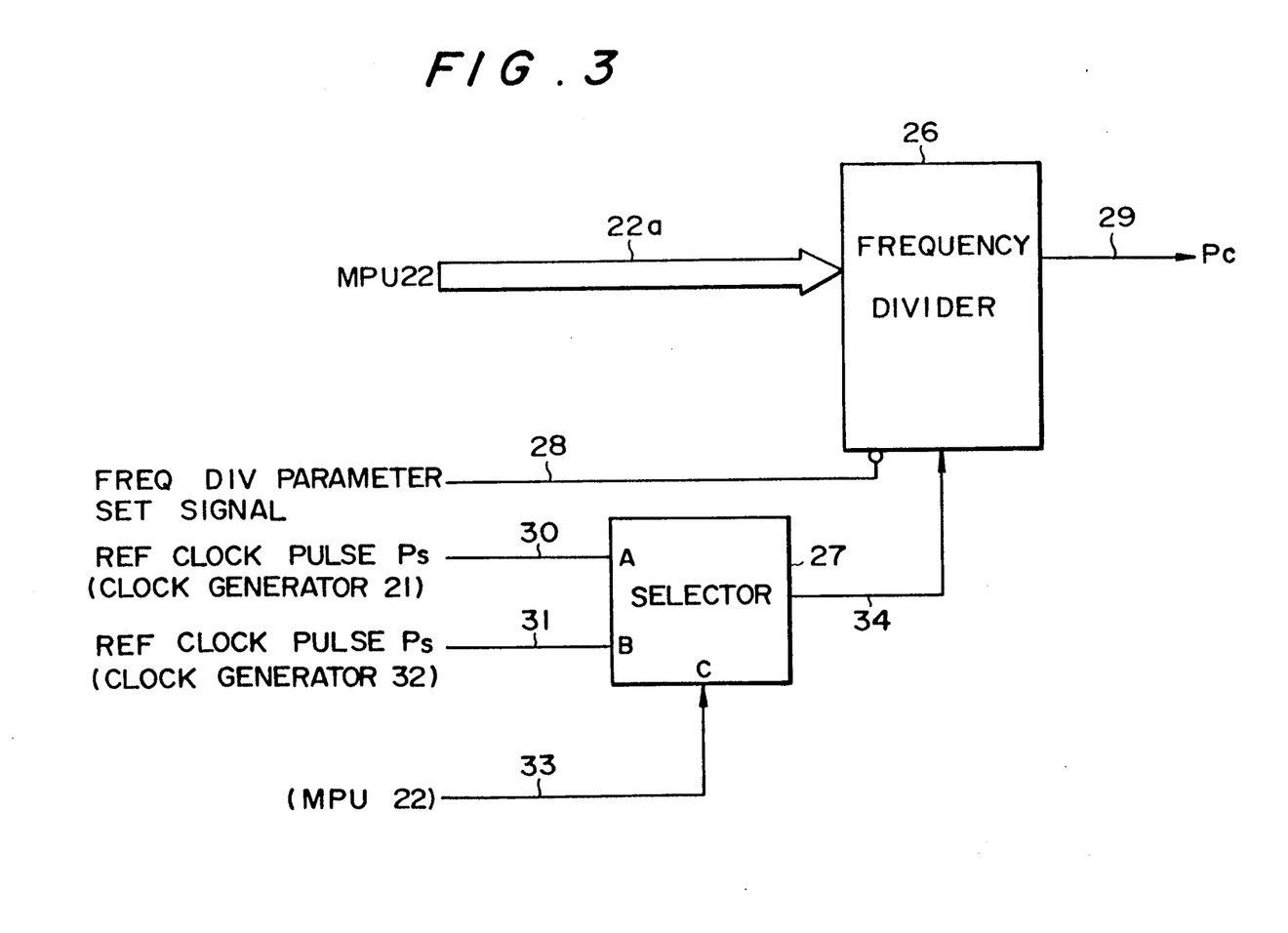
FIG. 3 is a schematic block diagram showing a specific construction of a frequency setting circuit included in the circuitry of FIG. 2.

FIG. 3 shows a specific construction of the frequency setting circuit 25. As shown, the frequency setting circuit 25 is made up of a frequency divider 26 and a selector 27. The frequency divider 26 has a signal input terminal connecting to the bus 22a, a control terminal connecting to the ..PU 22 via a signal line 28, and an output terminal connecting to the clock input CLK of the IC card 23 via a signal line 29. On the other hand, the selector 27 has a terminal A connecting to the clock output of the CPU 20 via a clock signal line 30, and a terminal B connecting to a second clock generator 32 via a clock signal line 31. The second clock generator 32 is implemented by an oscillator which oscillates reference clock pulses Ps having a frequency of 7.15909 megahertz. Further, the selector 27 has a control terminal connecting to the MPU 22 via a signal line 33, and an output terminal connecting to a clock input terminal of the frequency divider 26.

Figure 4:
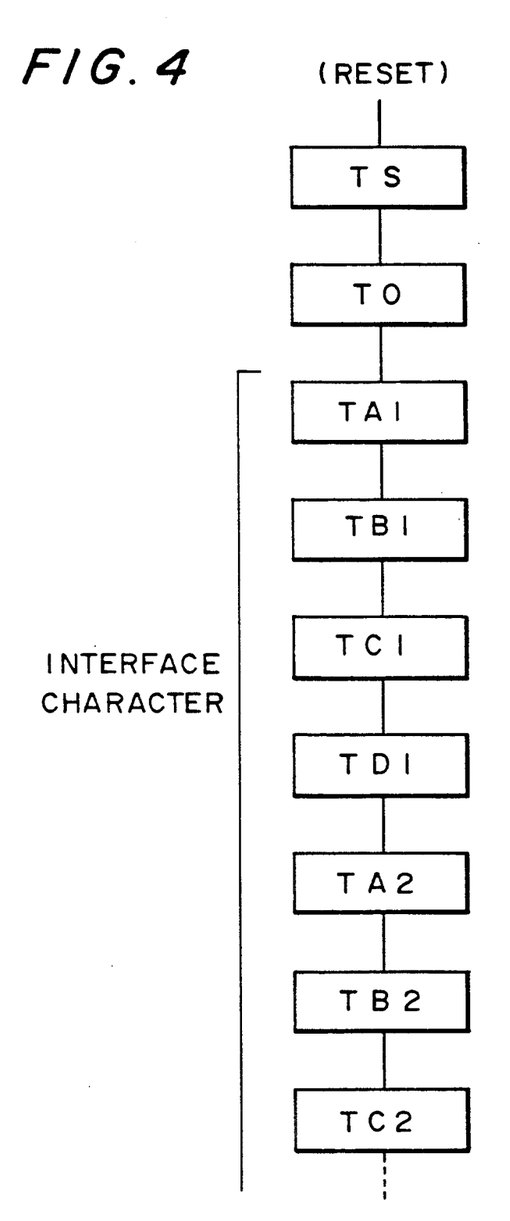
FIG. 4 shows a specific data format of an IC card.

Referring to FIG. 4, a data format of an answer-to-reset signal associated with the IC card 23 is shown. As shown, the IC card 23 stores various kinds of data, or characters, in a particular signal format as prescribed by ISO/IDS 7816-3 ANNEX A. The data are made up of initializing data TS, format data TO, operating clock frequency data TA1, operating voltage data TB1, data TC1 representative of a delay between data blocks, a protocol mode TD1 for block transmission, a one-block transmission unit TA2, another operating voltage data TB2 (having priority over the voltage data TB1), and data TC2 representative of a waiting time between data. The clock frequency data TA1 to the waiting time data TC2 shown in the figure are representative of interface characters. Further, the IC card 23 stores other various kinds of data such as data associated with a customer and transaction command data.

Figure 5A:
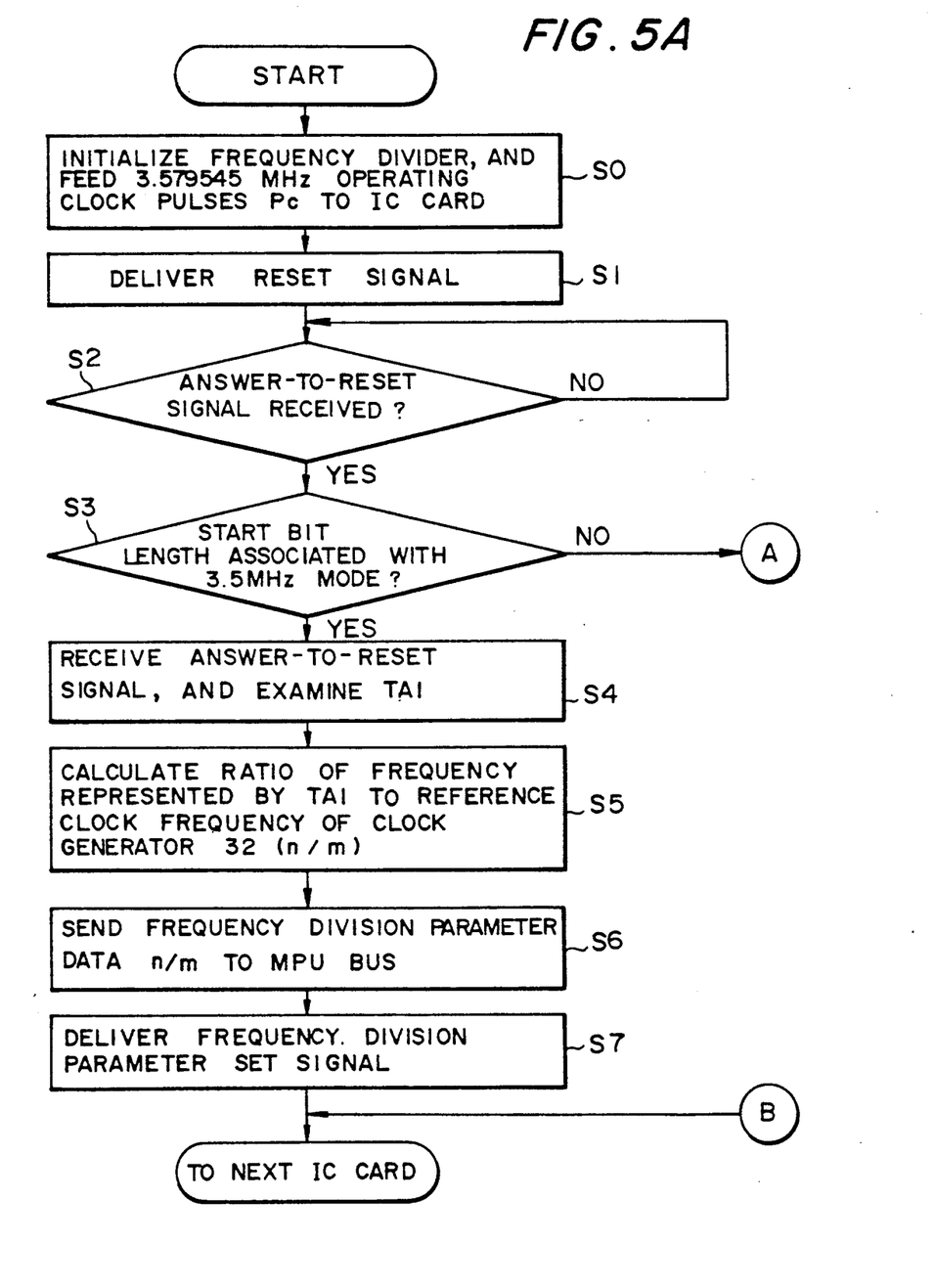
FIGS. 5A and 5B are flowcharts demonstrating a specific operation of the reader/writer shown in FIG. 2.
Figure 5B:
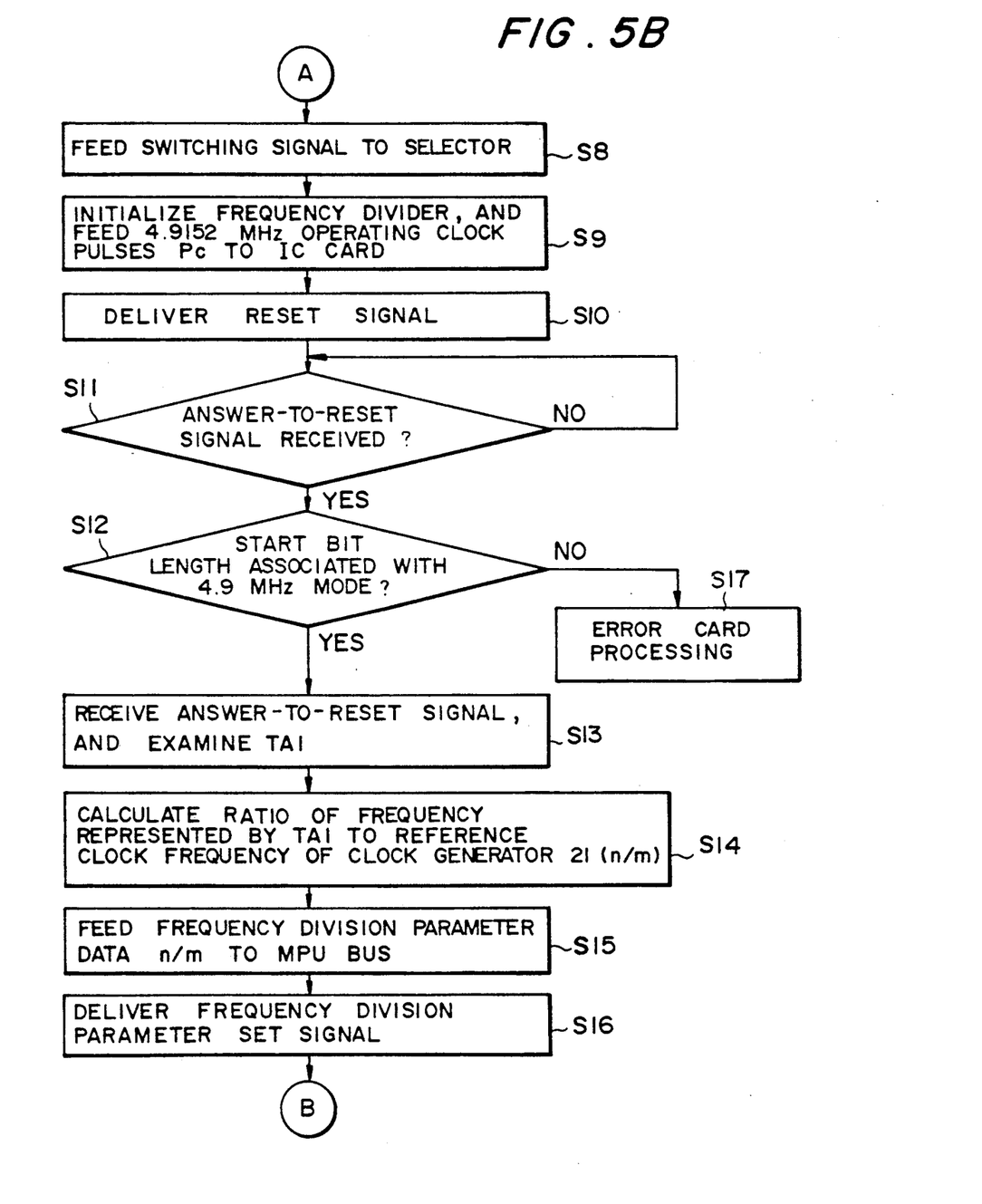

The operation of the IC card reader/writer 5 having the specific construction shown in FIGS. 2 and 3 will be described with reference to FIGS. 5A and 5B.

The IC card 23 is inserted in the IC card reader/writer 5 after the power switch of the processing apparatus 1 has been turned on. Then, the MPU 22 loads a register built therein with a frequency division parameter data 1/x (x being 2, for example) while feeding the parameter data to the frequency divider 26 in the form of a parallel signal over the bus 22a. Simultaneously, the MPU 22 delivers a frequency parameter set signal to the frequency divider 26 over the signal line 28. Specifically, the frequency parameter set signal is fed to the control terminal of the frequency divider 26 as a signal having a high level or a low level, whereby the frequency division paramter 1/x is set in the frequency divider 26. On the other hand, immediately after the turn-on of the power switch, the MPU 22 feeds to the control terminal C of the selector 27 a switching signal which has a high level or a low level, over the signal line 33. The terminal B of the selector 27 is connected to the clock signal line 34. In this condition, the reference clock pulses Ps generated by the clock generator 32 and having a frequency of 7.15909 megahertz are applied to the frequency divider 26 over the clock signal line 34. Since the frequency division parameter 1/x (x being 2) has been set in the frequency divider 26, the frequency divider 26 produces operating clock pulses Pc whose frequency is 3.579545 megahertz, i.e. $7.15909 \times \frac{1}{2} = 3.579545$. The clock pulses Pc are fed to the clock input CLK of the IC card 23. The frequency divider 26 is initialized by the procedure described so far, as represented by a step S0 in FIG. 5A.

The step S0 is followed by a step S1 in which the MPU 22 feeds a reset signal Rs to the IC card 23 over the signal line 35 under the control of the CPU 20. In response, the IC card 23 returns an answer-to-reset signal to the MPU 22 over the I/O signal line 36 (S2). The answer-to-reset signal has a bit length, or start bit length, which is selected in conformity to a standardized transfer rate such as 9800 bits per second. The MPU 22 measures the start bit length of the returned answer-to-reset signal to see if the IC card 23 has a frequency mode which it can identify.

When the start bit length has a frequency of 3.579545 megahertz, the MPU 22 determines that the IC card 23 has an identifiable frequency mode. Then, on receiving the answer-to-reset signal, the MPU 22 initializes the various units of the IC card processing apparatus 1 on the basis of the initializing data TS while confirming the format of the IC card 23 on the basis of the format data TO (S4). Executing the step S4, the MPU 22 checks the operating clock frequency data TA1 stored in the IC card 23. When the MPU 22 determines that the data TA1 is representative of a frequency of 3.579545 megahertz, it advances to a step S5 for calculating the ratio of the clock frequency represented by the data TA1 to the frequency of the reference clock pulse Ps (7.15909 megahertz) being generated by the clock generator 32, i.e. n/m.

On determining that the ratio n/m is ½, for example, the MPU 22 loads the internal register thereof with frequency parameter data of ½ while delivering the frequency parameter data ½ to the bus 22a in the form of a parallel signal (S6). At the same time, the MPU 22 executes a step S7 for feeding out a frequency parameter set signal to the signal line 28. As a result the frequency division parameter ½ is set in the frequency divider 26. The selector 27 has the terminal B connecting to the clock signal line 34, as stated earlier. Hence, the reference clock pulses Ps having a frequency of 7.15909 megahertz and being generated by the clock generator 32 are fed to the frequency divider 26 over the clock signal line 34. The frequency divider 26 divides the input reference clock pulses Ps by the frequency division parameter ½, thereby producing clock pulses Pc whose frequency is 3.579545 megahertz. The 3.579545 megahertz clock pulses are applied to the clock input CLK of the IC card 23, whereby the IC card 23 the operating clock frequency of which is also 3.579545 megahertz is rendered operative.

Assume that the start bit length of the answer-to-reset signal returned from the IC card 23 is not representative of the 3.579545 megarhertz mode as decided in the step S3. Then, the MPU 22 advances to a step S8 to deliver a high-level or low-level switching signal to the control terminal C of the selector 27 over the signal line 33. In response, the selector 27 selects an input appearing on its input terminal A. The terminal A is connected by the signal line 30 to the clock output of the CPU 20 on which the clock pulses from the clock generator 21 appear. Consequently, the reference clock pulses Ps having a frequency of 14.7456 megahertz are routed through the selector 27 and clock signal line 34 to the frequency divider 26.

The step S8 is followed by a step S9 in which the MPU 22 loads the internal register with a frequency parameter data of 1/y (y being 3, for example) while feeding this frequency parameter data 1/y to the bus 22a in the form of a parallel signal. At the same time, the MPU 22 delivers a frequency division parameter set signal to the signal line 28. As a result, the frequency division parameter data 1/y is set in the frequency divider 26. The frequency divider 26 divides the 14.7456 megahertz reference clock pulses Ps by the frequency division prameter ⅓, so that clock pulses Ps whose frequency of which is 4.9152 megahertz are fed to the clock input CLK of the IC card 23. The frequency divider 26 is initialized by such a sequence of steps.

Subsequently, the MPU 22 delivers a reset signal Rs to the IC card 23 over the signal line 35 under the control of the CPU 20 (S10). The IC card 23 in turn returns an answer-to-reset signal to the MPU 22 over the I/O signal line 36 (S11). The MPU 22 measures the start bit length of the answer-to-reset signal to see if the IC card 23 has an identifiable frequency mode (S12). When the start bit length conforms to the transfer rate of 9600 bits per second, the MPU 22 determines that the IC card 23 has a 4.9152 megahertz mode. On receiving the answer-to-reset signal from the IC card 23, the MPU 22 initializes the various units of the reader/writer 5 on the basis of the initializing data TS while confirming the format of the IC card 23 on the basis of the format data TO (S13).

When the MPU 22 determines that the IC card 23 does not have the 4.9152 megahertz mode in the step S12, it executes a step S17 assigned to error card processing by deciding that it cannot handle the IC card 23.

If the IC card 23 has the 4.9152 megahertz mode as decided in the step S12, the MPU 22 advances to a step S13 for confirming the operating clock frequency data TA1 of the IC card 23. If the data TA1 is representative of a frequency of 4.9152 megahertz, the MPU 22 executes a step S14 to calculate the ratio of the clock frequency represented by the data TA1 to the frequency of the reference clock pulses Ps (14.7456 megahertz) being generated by the clock generator 21, i.e. n/m.

On determining that the ratio n/m is ⅓, for example, the MPU 22 loads the internal register thereof with frequency parameter data of ⅓ while delivering the frequency parameter data ⅓ to the bus 22a in the form of a parallel signal (S15). At the same time, the MPU 22 executes a step S16 for feeding out a frequency parameter set signal to the signal line 28 while loading the frequency divider 26 with the frequency division parameter ⅓. Since the reference clock pulses Ps the frequency of which is 14.7456 megahertz are fed from the clock generator 21 to the frequency divider 26, operating clock pulses Pc having a frequency of 4.9152 megahertz is applied to the clock input CLK of the IC card 23. Hence, the reader/writer 5 is operable with the IC card 23 which needs clock pulses of 4.9152 megahertz in the same manner as with the IC card 23 having another frequency mode.

After the reader/writer 5 has fed operating clock pulses Pc the frequency of which matches the frequency mode of the IC card 23 as stated above, it reads necessary transaction data out of the card 23 to execute ordinary transactions processing.

In summary, in accordance with the present invention, an IC card reader/writer has frequency identifying means for identifying an operating clock frequency particular to an IC card by referencing frequency data stored in the card, and a frequency setting circuit for converting, in response to an output of the frequency identifying means, reference clock pulses being generated by a clock generator into clock pulses the frequency of which matches the card. The IC cad reader/writer, therefore, is operable with IC cards having different operating clock frequencies, implementing a wide variety of applications at low cost.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An IC card reader/writer for interchanging data with an IC card when said IC card is mounted to said IC card reader/writer, comprising:

connector means for detachably connecting said IC card to said IC card reader/writer;

frequency mode identifying means for determining whether or not the IC card has an identifiable frequency mode on the basis of signals scanned from the IC card connected to the card reader/writer;

clock frequency determining means for, when said frequency mode identifying means determines that the frequency mode of the IC card is identifiable, reading frequency data stored in said IC card and representative of an operating clock frequency for thereby determining the operating clock frequency;

reference clock generating means for generating reference clock pulses having a predetermined frequency to feed clock pulses to the IC card, said reference clock generating means comprising a first reference clock generator connected to the frequency identifying means and a second reference clock generator connected to the frequency setting means, and generating clock pulses which control the frequency mode identifying means; and frequency setting means for converting, in response to an output of said clock frequency determining means, the reference clock pulses into clock pulses in response to which the IC card is operable, and for applying said clock pulses to said IC card.

2. An IC card reader/writer in accordance with claim 1, wherein said frequency setting means comprises a frequency divider connected to the output of the clock frequency determining means and a selector means for selectively feeding clock pulses generated by said first and second clock generators to said frequency divider.

3. An IC card transactions processing apparatus having an IC card reader/writer with inputting means and displaying means for performing transactions using an IC card by interchanging data with said IC card when it is mounted in said IC card reader/writer, comprising:

connector means for detachably connecting said IC card to said IC card reader/writer;

frequency mode identifying means for determining whether or not the IC card has an identifiable means for determining whether or not the IC card has an identifiable frequency mode on the basis of signals scanned from said IC card connected to said reader/writer;

clock frequency determining means for, when said frequency mode identifying means determines that the frequency mode of the IC card is identifiable, reading frequency data stored in said IC card and representative of an operating clock frequency for thereby determining the operating clock frequency;

reference clock generating means for generating reference clock pulses having a predetermined frequency to feed clock pulses to the IC card, said reference clock generating means comprising a first reference clock generator connected to the frequency identifying means and a second reference clock generator connected to the frequency setting means, and generating clock pulses which control the frequency mode identifying means; and frequency setting means for converting, in response to an output of said clock frequency determining means, the reference clock pulses into clock pulses in response to which the IC card is operable, and for applying said clock pulses to said IC card.

4. An apparatus in accordance with claim 3, wherein said frequency setting means comprises a frequency divider connected to the output of the clock frequency determining means and a selector means for selectively feeding clock pulses generated by said first and second clock generators to said frequency divider.

* * * * *